United States Patent
Kirk et al.

(12) 
(10) Patent No.: US 6,335,404 B1
(45) Date of Patent: *Jan. 1, 2002

(54) AQUEOUS PROCESS FOR PREPARING AQUEOUS WEIGHT CARBOXYL CONTAINING POLYMERS

(75) Inventors: Thomas Cleveland Kirk, Langhorne; David Witiak, Yardley, both of PA (US)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/223,351

(22) Filed: Apr. 5, 1994

(51) Int. Cl.$^7$ .............................. C08F 2/16; C08F 4/26
(52) U.S. Cl. ........................................ 526/93; 526/271
(58) Field of Search .................. 526/93, 229, 230, 526/233, 234, 271

(56) References Cited

U.S. PATENT DOCUMENTS

| | | | |
|---|---|---|---|
| 3,635,915 A | | 1/1972 | Gale |
| 4,314,044 A | | 2/1982 | Hughes et al. |
| 4,519,920 A | | 5/1985 | Fukumoto et al. |
| 4,555,557 A | | 11/1985 | Fukumoto et al. |
| 4,659,793 A | | 4/1987 | Yang |
| 4,668,735 A | | 5/1987 | Fukumoto et al. |
| 4,687,789 A | | 8/1987 | Gonnet et al. |
| 4,709,091 A | | 11/1987 | Fukumoto |
| 4,725,655 A | | 2/1988 | Denzinger et al. |
| 5,064,563 A | | 11/1991 | Yamaguchi et al. |
| 5,073,612 A | * | 12/1991 | Irie ............................. 526/240 |
| 5,100,980 A | | 3/1992 | Hughes et al. |
| 5,104,951 A | * | 4/1992 | Seelmann-Eggebert ..... 526/240 |
| 5,135,677 A | | 8/1992 | Yamaguchi et al. |
| 5,223,590 A | | 6/1993 | Hughes et al. |
| 5,244,988 A | | 9/1993 | Hughes et al. |
| 5,268,437 A | * | 12/1993 | Holy .......................... 526/229 |

FOREIGN PATENT DOCUMENTS

| | | |
|---|---|---|
| CA | 1243446 | 10/1988 |
| DE | 4008696 | 9/1991 |
| EP | 79165 | 5/1983 |
| EP | 511850 | 11/1992 |
| JP | 5064118 | 5/1975 |
| JP | 5968563 | 10/1985 |
| JP | 5968565 | 10/1985 |
| JP | 1262871 | 10/1989 |
| JP | 308453 | 6/1990 |
| JP | 1145851 | 1/1991 |
| JP | 130210 | 11/1993 |

OTHER PUBLICATIONS

U.S. Serial No. 3,375, Creamer, et al., filed Jan. 12, 1994.

* cited by examiner

*Primary Examiner*—Christopher Henderson

(57) ABSTRACT

The present invention provides an efficient aqueous polymerization process for preparing a water soluble polymer product having a molecular weight of less than 30,000. The polymer product is formed from about 3 to about 50 weight percent of at least one monoethylenically unsaturated dicarboxylic acid monomer, from about 50 to about 97 weight percent of at least one monoethylenically unsaturated monocarboxylic acid monomer, and from 0 to about 40 weight percent of one or more carboxyl-free monoethylenically unsaturated monomers. The process of the present invention may be run as a batch or continuous process. The process uses at least one chain transfer agent and is conducted at an aqueous solution pH of about 3 or less to keep the molecular weight of the polymer product below 30,000. The polymer product produced by the process of the present invention is useful as an additive in detergents, cleaning formulations, and water circulating systems.

23 Claims, No Drawings

US 6,335,404 B1

AQUEOUS PROCESS FOR PREPARING AQUEOUS WEIGHT CARBOXYL CONTAINING POLYMERS

FIELD OF INVENTION

This invention relates to an efficient aqueous free radical addition polymerization process for preparing novel water soluble polymer products having a weight average molecular weight less than 30,000. These polymer products are formed from about 3 to about 50 weight percent of at least one monoethylenically unsaturated dicarboxylic acid monomer, and from about 50 to about 97 weight percent of at least one water soluble monoethylenically unsaturated monocarboxylic acid monomer, and from 0 to about 40 weight percent of one or more carboxyl-free monoethylenically unsaturated monomers, based on the total weight of monomers. More specifically, the process of the present invention provides an efficient method of controlling the molecular weight of the polymer product through the use of at least one chain transfer agent and through maintaining the polymerization at an aqueous solution pH of 3 or less. The chain transfer agent has the added benefit, in certain applications, of enhancing the performance of the polymer product.

BACKGROUND OF THE INVENTION

Polymers of monoethylenically unsaturated dicarboxylic acids, monoethylenically unsaturated monocarboxylic acids, and carboxyl-free monoethylenically unsaturated monomers having weight average molecular weights (Mw) less than 30,000 are useful as scale inhibitors, deflocculants, dispersants, in water circulating systems and as encrustation inhibitors, builders, anti-filming agents, sequestering agents, and dispersants in detergents and cleaning formulations.

A well known problem in preparing these polymers is that it is difficult to control the molecular weight and degree of branching during the preparation of these polymers. The control of molecular weight is especially difficult when preparing polymers containing low levels of monoethylenically unsaturated dicarboxylic acids of from about 3 to about 50 weight percent. Another problem associated with preparing these polymers is that it is difficult to achieve low residual levels of monomer in the polymer product, preferably less than 3.0 weight percent based on the weight of the polymer product.

One solution to controlling the molecular weight of the polymer is disclosed in U.S. Pat. No. 5,100,980 to Hughes et al., hereinafter referred to as "'980 patent." The '980 patent discloses a process for preparing copolymers containing from about 3 to about 25 weight percent monoethylenically unsaturated dicarboxylic acids and 75 to about 97 weight percent monoethylenically unsaturated monocarboxylic acids having a Mw less than 25,000. The process described in the '980 patent requires the monomers to be polymerized in the presence of a polymerization initiator, copper salt polymerization moderator, and neutralizer. The presence of the copper salt moderator in the '980 patent is believed to promote high conversion of the monomers and control the molecular weight of the resulting copolymers.

U.S. Pat. No. 5,244,988 also to Hughes, et al., hereinafter referred to as the "'988 Patent," discloses another process for making low molecular weight copolymers of ethylenically unsaturated dicarboxylic acid monomers. The copolymers in the '988 patent are produced by cofeeding the monomers and a neutralizer in the presence of a metal salt activator. The copolymers produced have molecular weights ranging from about 1000 to about 100,000 and the cofeeding of the monomers is believed to produce a copolymer of more uniform composition.

However, the processes disclosed in the '980 and '988 patents produce a copolymer which is completely or partially neutralized. It may be desirable in some applications for performance or cost reasons to directly produce a polymer product which is not neutralized. Additionally, the '988 and '980 patents produce a polymer product which is colored dark yellow to brown due to the processing conditions.

Therefore, it is an aim of this invention to produce polymers formed from 3 to 50 weight percent monoethylenically unsaturated dicarboxylic acids, and 50 to 97 weight percent monoethylenically unsaturated monocarboxylic acids having weight average molecular weights less than 30,000 without using a neutralizer.

It is also an aim of this invention to provide a process for making polymers formed from monoethylenically unsaturated dicarboxylic acids and monoethylenically unsaturated monocarboxylic acids where the resulting polymer product has low color.

It is also an aim of this invention to produce polymers formed from monoethylenically unsaturated dicarboxylic acids and monoethylenically unsaturated monocarboxylic acids having comparable or improved performance over polymers currently in use.

SUMMARY OF THE INVENTION

We have discovered an aqueous free radical addition polymerization process comprising:
  a) establishing an initial charge of water in a reactor;
  b) adding into the reactor to form a reaction mixture
     i) at least one water soluble chain transfer agent,
     ii) at least one water soluble initiator,
     iii) at least one metal promoter,
     iv) from about 50 to about 97 weight percent, based on the total weight of the monomer added to the reactor, of at least one water soluble monoethylenically unsaturated monocarboxylic acid monomer,
     v) from about 3 to about 50 weight percent, based on the total weight of the monomer added to the reactor, of at least one monoethylenically unsaturated dicarboxylic acid monomer,
     vi) from 0 to about 40 weight percent, based on the total weight of the monomer added to the reactor, of one or more water soluble carboxyl-free monoethylenically unsaturated monomers;
  c) maintaining the reaction mixture at a temperature of from about 60° C. to about 120° C. over a reaction time;
  d) maintaining the reaction mixture at a pH of 3 or less over the reaction time; and
  e) recovering a water soluble polymer product; wherein the chain transfer agent, initiator, and monoethylenically unsaturated monocarboxylic acid monomer are added to the reactor over at least 25 percent of the reaction time.

DETAILED DESCRIPTION OF THE INVENTION

We have discovered an efficient, cost effective aqueous free radical polymerization process for making a water soluble polymer product formed from a) at least one monoethylenically unsaturated dicarboxylic acid, hereinafter called "dicarboxylic acid monomer", b) at least one monoethylenically unsaturated monocarboxylic acid, hereinafter called "monocarboxylic acid monomer," and optionally c) one or more carboxyl-free monoethylenically unsaturated monomers, hereinafter called "carboxyl-free monomers". This process provides a route for making a polymer product containing from about 3 to about 50 weight percent of at least one dicarboxylic acid monomer, from about 50 to about 97 percent of at least one monocarboxylic acid monomer, and from 0 to 40 weight percent of one or more carboxyl-free monomers. The polymer product made by the process of the present invention has a molecular weight less than 30,000. To achieve molecular weights less than 30,000, the process of the present invention uses at least one chain transfer agent and at least one metal promoter in combination with at least one initiator. Additionally, the process of the present invention is conducted at an aqueous solution pH of about 3 or less. Conducting the polymerization at a pH of about 3 or less allows the dicarboxylic acid monomer to react with the other monomers rather than react only with the chain transfer agent.

The process of the present invention has the added advantage of producing a polymer product which has comparable or improved performance properties over polymers currently in use. The resulting polymer product is also low in color which may be desirable to the end user of the polymer product.

In the process of the present invention first an initial charge of water is placed in a reactor. The following ingredients are added to the reactor: i) at least one water soluble chain transfer agent, ii) at least one water soluble initiator, iii) at least one metal promoter, iv) at least one monocarboxylic acid monomer, v) at least one dicarboxylic acid monomer, and optionally vi) one or more carboxyl-free monomers to form a reaction mixture. The reaction mixture is maintained at a reaction temperature of from about 60° C. to about 120° C. over a reaction time to polymerize the monomers. By "reaction time" we mean the time over which the ingredients are added to the reactor plus any additional time the reaction mixture is held at the reaction temperature. The reaction mixture is also maintained at an aqueous solution pH of about 3 or less over the reaction time. The chain transfer agent, initiator, and monocarboxylic acid monomer are added to the reactor over at least 25 percent of the reaction time.

The dicarboxylic acid monomer may be added to the reactor over a percentage of the reaction time, or a portion or all of the dicarboxylic acid monomer may be added to the initial charge of water. It is preferred to add the dicarboxylic acid monomer to the reactor by feeding the dicarboxylic acid monomer over a percentage of the reaction time. The dicarboxylic acid monomer is fed over a time of about 10 to 100 percent, preferably from about 10 to about 75 percent, and most preferably from about 15 to about 60 percent of the reaction time.

The dicarboxylic acid monomer may be fed continuously at a linear (constant) or nonlinear rate, or fed intermittently into the reactor. By "intermittently" we mean the dicarboxylic acid monomer feed to the reactor is turned on and off repeatedly over a percentage of the reaction time. For example, in this intermittent feeding procedure, the dicarboxylic acid monomer may be turned on for a time of from about 10 to about 50 percent of the reaction time and then turned off for a period of about the same time. Preferably, the dicarboxylic acid is fed intermittently.

The metal promoter may be added to the reactor over a percentage of the reaction time, or a portion or all may be added to the initial charge of water. Additionally, the metal promoter may be added to the reactor in one charge at some point in the reaction time. Preferably, the metal promoter is added to the reactor over a percentage of the reaction time. The metal promoter, when added to the reactor over a percentage of the reaction time, may be fed continuously at a linear or nonlinear rate, or intermittently into the reactor. The metal promoter, when added to the reactor over a percentage of the reaction time, may be fed into the reactor from about 1 to about 100 percent of the reaction time.

The chain transfer agent is added to the reactor over at least 25 percent of the reaction time. Optionally, up to 15 percent of the total chain transfer agent added to the reactor may be added to the initial charge of water. Preferably, all the chain transfer agent is fed to the reactor over at least 25 percent of the reaction time. The chain transfer agent is preferably fed to the reactor over at least 30 percent, more preferably from about 40 to about 85 percent of the reaction time. The chain transfer agent may be fed continuously at a linear or nonlinear rate, or fed intermittently into the reactor.

The initiator is added to the reactor over at least 25 percent of the reaction time. Optionally, up to 15 percent of the total initiator added to the reactor may be added to the initial charge of water. Preferably, all the initiator is fed to the reactor over at least 25 percent of the reaction time. The initiator is preferably fed over at least 50 percent of the reaction time. The initiator may be fed continuously at a linear or nonlinear rate, or fed intermittently into the reactor.

The monocarboxylic acid monomer is added to the reactor over at least 25 percent of the reaction time. Optionally, up to 15 percent of the total monocarboxylic acid monomer added to the reactor may be added to the initial charge of water. Preferably, all the monocarboxylic acid monomer is fed to the reactor over at least 25 percent of the reaction time. The monocarboxylic acid monomer is preferably fed over at least 50 percent of the reaction time. The monocarboxylic acid monomer may be fed continuously at a linear or nonlinear rate, or fed intermittently into the reactor.

The carboxyl-free monomer may be added to the reactor over a percentage of the reaction time, or a portion or all of carboxyl-free monomer may be added to the initial charge of water. The preferred way of adding the carboxyl-free monomer depends upon the reactivity of the carboxyl-free monomer. If the reactivity of the carboxyl free monomer is comparable to the monocarboxylic monomer then the carboxyl-free monomer should be added according to the preferred procedures for the monocarboxylic acid. However, if the reactivity of the carboxyl free monomer is comparable to the dicarboxylic monomer then the carboxyl-free monomer should be added according to the preferred procedures for the dicarboxylic acid.

In a preferred embodiment of the process of the present invention, the initiator and monocarboxylic acid monomer are fed into the reactor over the same reaction time. The chain transfer agent is fed for a time less than the initiator and monocarboxylic acid monomer. Preferably the chain transfer agent is fed for a time of about 10 to about 25 percent less than the initiator and monocarboxylic acid monomer. The dicarboxylic acid monomer is also fed for a time less than the initiator and monocarboxylic acid monomer. Preferably the monocarboxylic acid monomer is fed for a time of about 25 to about 75 percent less than the initiator and monocarboxylic acid monomer.

Preferably, the initiator, chain transfer agent, metal promoter, dicarboxylic acid monomer, monocarboxylic acid monomer, and carboxyl-free monomer feeds are all fed in separate streams into the reactor. However, it is possible to combine feeds in accordance to procedures well known to those skilled in the art. For example, where no adverse reactions are expected, the monomers may be combined in one feed stream, or for example, the chain transfer agent and metal promoter may be combined in one feed stream.

In the process of the present invention, the reaction should be maintained at a pH of about 3 or less, more preferably at a pH of about 2 or less, and most preferably at a pH of 1.8 or less. In the most preferred embodiment of the process of the present invention, the monomers containing carboxylic acid moieties are not neutralized with a common base, such as for example sodium hydroxide, prior to being added into the reactor; and no neutralizer is added into the reactor over the reaction time. However, it is possible to add partially neutralized carboxylic acid monomers, or to add a neutralizer into the reactor as long as the pH of the reaction mixture is maintained at a pH of about 3 or less. Possible neutralizers include common bases, for example ammonium hydroxide, or an alkali metal base such as sodium hydroxide, potassium hydroxide, or lithium hydroxide.

The temperature of the reaction mixture over the reaction time should be maintained below the boiling point of the reaction mixture. The reaction mixture temperature should be maintained at a temperature of from about 60 to about 120° C., preferably from about 70 to about 100° C., most preferably from about 70 to about 80° C. over the reaction time. The reaction mixture pressure should be maintained at a pressure of from about atmospheric to about 40 pounds per square inch gauge (psig). Preferably, the reaction mixture pressure is maintained at atmospheric pressure. The polymerization may be conducted in air or any inert atmosphere such as nitrogen or argon.

The dicarboxylic acid monomer which may be used in the process of the present invention includes monoethylenically unsaturated dicarboxylic acids and the anhydrides of the cis dicarboxylic acids containing from 4 to about 10, preferably from about 4 to about 6, carbon atoms per molecule. Examples of suitable dicarboxylic acid monomers include maleic acid, itaconic acid, mesaconic acid, fumaric acid, citraconic add, a-methylene glutaric acid, and the anhydrides of cis dicarboxylic acids, such as maleic anhydride, cis-3,4,5,6-tetrahydrophthalic anhydride, and combinations thereof. Preferably, the dicarboxylic acid monomer is selected from the group consisting of maleic acid, itaconic add, mesaconic acid, fumaric acid, citraconic acid, and the anhydrides of cis dicarboxylic acids, such as maleic anhydride, and combinations thereof; and most preferably is selected from the group consisting of maleic anhydride and maleic acid, and combinations thereof. The weight percent dicarboxylic acid monomer based on the total weight of monomers added to the reactor may be from about 3 to about 50 weight percent, preferably from about 5 to about 35, more preferably from about 5 to about 25, and most preferably from about 5 to about 15 weight percent.

The monocarboxylic acid monomer useful in the process of the present invention includes monoethylenically unsaturated monocarboxylic acids containing from about 3 to about 6 carbon atoms per molecule. Useful monocarboxylic acid monomers include acrylic acid, methacrylic acid, vinylacetic acid, crotonic acid, and combinations thereof. The most preferred monocarboxylic acid monomers are acrylic acid, methacrylic acid, and combinations thereof. The weight percent monocarboxylic acid monomer based on the total weight of monomers may be from about 50 to about 97 weight percent, preferably from about 65 to 95, more preferably from about 75 to about 95, and most preferably from about 85 to 95 weight percent.

The carboxyl-free monomers are water soluble monoethylenically unsaturated carboxyl-free monomers such as for example alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary-butylacrylamide, N-methylacrylamide, N,N-dimethylacrylamide; acrylonitrile, methacrylonitrile; allyl alcohol; allylsulfonic acid, methallylsulfonic acid; allyl phosphonic acid; vinylphosphonic acid; dimethylaminoethyl acrylate, dimethylaminoethyl methacrylate; phosphoethyl methacrylate; N-vinylpyrollidone, N-vinylformamide, N-vinylimidazole; vinyl acetate, styrene; vinylsulfonic acid and its salts; and 2-acrylamido-2-methylpropanesulfonic acid and its salts; and combinations thereof. The weight percent carboxyl-free monomer based on the total weight of monomers added to the reactor may be from about 0 to about 40 weight percent, preferably from about 0 to 20, and most preferably from about 0 to 10 weight percent.

The metal promoter enhances the conversion of the dicarboxylic acid monomer to polymer product. Metal promoters useful in the process of the present invention are water soluble transition metal salts such as the salts of cobalt, iron, copper, cerium, nickel, manganese, molybdenum, zirconium, vanadium, zinc, and combinations thereof. Useful water soluble metal salts must be capable of generating the metal ion in an aqueous solution and include the salts of sulfates, nitrates, chlorides, bromides, acetates, phosphates and gluconates; such as for example ferrous sulfate heptahydrate, cuprous acetate, ferrous acetate, manganese acetate, cupric acetate, ferrous and ferric chloride, ferrous and ferric phosphate, cuprous and cupric chloride, cuprous and cupric bromide, cupric nitrate, ferric sulfate, manganese bromide, manganese chloride, and combinations thereof. Preferably, the metal promoter is a water soluble metal salt of iron, copper, and combinations thereof, and most preferably is the water soluble salt of iron.

The concentration in the reaction mixture of the metal promoter should be from about 0.25 to about 250 parts per million (ppm) of the metal ion based on the total weight of the monomers added to the reactor. Preferably the concentration of metal ion is from about 1 to about 25 ppm, and most preferably from about 3 to about 20 ppm.

Suitable water-soluble initiators for the process of the present invention are any conventional free radical water-soluble initiator, water-soluble redox initiator, and combinations thereof. The total initiator added to the reaction mixture should be from about 0.5 to about 25, preferably from about 1 to about 6 weight percent based on the total amount of monomer added.

Suitable free-radical initiators include persulfates, peresters, percarbonates, perphosphates, hydrogen peroxide, certain alkyl hydroperoxides, dialkyl peroxides, ketone peroxides, and azo initiators and combinations thereof. Specific examples of free-radical initiators include for example ammonium persulfate, potassium persulfate, sodium persulfate, sodium perphosphate, ammonium perphosphate, hydrogen peroxide, t-butyl hydroperoxide, di-tertiary butyl peroxide, tertiary-amyl hydroperoxide, methylethyl ketone peroxide, 2,2-azobis(cyanovaleric acid), and combinations thereof.

Suitable water-soluble redox initiators include, but are not limited to, sodium bisulfite, sodium sulfite, persulfates, hypophosphites, isoascorbic acid, sodium formaldehydesulfoxylate and combinations thereof.

A preferred method for making the polymer product of the present invention uses a persulfate initiator such as sodium persulfate or potassium persulfate.

Chain transfer agents useful in the process of the present invention include the alkali metal salts of sulfites such as sodium and potassium sulfite, sodium and potassium bisulfite, and sodium and potassium metabisulfite; halogen containing compounds such as carbon tetrachloride, bromoform, bromotrichloromethane; β-mercaptopropionic acid; $C_1$–$C_4$ aldehydes; mercaptans and thioesters such as hydroxyethyl mercaptan, n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate; secondary alcohols such as isopropanol; sulfur containing acids such as thioglycollic acid; and combinations thereof. Preferably the chain transfer agent is an alkali metal salt of sulfite, and is most preferably the alkali metal salt of bisulfite or metabisulfite. The chain transfer agent is used in an amount from about 1 to about 35 weight percent, preferably from about 5 to about 20 weight percent based on the total weight of monomer added to the reaction mixture.

Depending on the chain transfer agent chosen, the chain transfer agent as used in the process of the present invention has the added advantage of being incorporated into the polymer structure and enhancing the performance of the polymer in certain applications.

The process of the present invention may be run as a batch process or a continuous process. By a "continuous process", we mean that a portion of the reaction mixture is removed from the reactor as the ingredients are being added into the reactor. In a continuous process, the total rate of ingredients being added into the reactor equals the rate of reaction mixture being removed. The process of the present invention may also be conducted as a semi-continuous process in that part of the process is conducted as a batch process and another part of the process is conducted as a continuous process. Preferably, the process of the present invention is run as a continuous process. The process of the present invention may be carried out in more than one reactor.

The reaction time of the process of the present invention depends on such variables as the amount of metal promoter added to the reaction mixture and the reaction temperature. However, typically in a batch process, the reaction time is from about 1 to about 5 hours. Preferably the reaction time is less than 3 hours, more preferably less than 2 hours. The reaction time may optionally include a hold time in which after all the ingredients are added into the reactor, the reaction mixture is maintained at the reaction temperature of about 60° C. to about 120° C. The hold time is preferably less than 60 minutes. In a continuous process, the reaction time is the average amount of time the reaction mixture resides in the reactor at the reaction temperature. The reaction time for a continuous process is hereinafter called the "residence time". The residence time is at least 30 minutes, preferably from about 45 to about 60 minutes.

The weight percent of solids in the reaction mixture, based on the total weight of the reaction mixture at the completion of the reaction time should be from about 30 to about 65 weight percent, and preferably from about 40 to about 60 weight percent.

At the completion of the reaction time, the combined residual level of dicarboxylic acid monomer and monocarboxylic acid monomer in the polymer product should be less than 2.7 weight percent, preferably less than 1 weight percent and most preferably less than 0.5 weight percent, based on the total weight of polymer product.

After the polymerization, the level of residual monomer and chain transfer agent may be optionally reduced by adding one or more initiators, reducing agents, or scavenging monomers which can assist in scavenging unreacted monomer and chain transfer agent. Preferably, any postpolymerization additions of initiators, reducing agents or scavenging monomers are conducted at or below the reaction temperature. Generally, any of the initiators suitable for the polymerization are also suitable for reducing the residual monomer and chain transfer agent content of the polymer mixture.

Typically, the level of initiator, reducing agent, or monomer added to reduce the residual monomer and chain transfer agent content of the polymer product is in the range of from about 0.5 to about 5.0, and preferably from about 1.0 to about 4.0 weight percent based on the total amount of monomer.

After the polymerization, the polymer product may be recovered and used as is, separated by conventional techniques such as spray drying to isolate the polymer solids, or diluted with water to adjust the percent reaction solids to less than 40 weight percent. If desired, excess initiator in the polymer product may be reduced with one or more common reducing agents such as sodium metabisulfite or isoascorbic acid. Additionally, the pH of the polymer product may be adjusted such as for example by adding a common base such as sodium hydroxide.

The weight average molecular weight (Mw) of the polymer product produced by the process of the present invention is from about 500 to about 30,000, preferably from about 1000 to about 20,000, more preferably from about 1000 to about 15,000, and most preferably from about 1,000 to about 10,000 as measured by gel permeation chromatography (GPC) based on a relative standard of 4500 Mw poly(acrylic acid). The polydispersity (the Mw divided by the number average molecular weight, Mn) of the polymer product is less than 2.5 preferably less than 2 and most preferably less than 1.8.

Certain polymer products produced by the process of the present invention are unique in that they show improved performance in comparison to polymers of similar molecular weight and monomer composition made by different processes. These unique polymer products are terminated at one or both ends with the chain transfer agent used in the process of the present invention. The chain transfer agent is selected from the group consisting of alkali metal salts of sulfites, bisulfites, metabisulfite, and combinations thereof. The polymer product is preferably formed from a dicarboxylic acid monomer of maleic acid or maleic anhydride, and a monocarboxylic acid of acrylic acid or methacrylic acid. The polymer product may be partially or completely neutralized after being made.

The polymer product produced by the process of the present invention is useful as an additive in cleaning compositions such as cleaning or detergent formulations used for hard surfaces; household, industrial and institutional laundry; and hand and automatic dishwashing. For example, the polymer product may be used as a builder, encrustation inhibitor, antiredeposition agent, anti-filming agent, sequestering agent, soil removal agent, and dispersant in cleaning and detergent formulations.

The polymer product is also useful for scale inhibition and corrosion control in any water circulating system such as those systems used in cooling water towers, boilers, water desalination plants, sugar recovery plants, oil drilling wells, reverse osmosis equipment, steam power plants, and heat exchange equipment.

The polymer product of the present invention may also be used as a dispersant for inorganic particulates such as pigments, kaolin clay, ceramics, calcium carbonate, zeolites, titanium dioxide; for aqueous emulsions such as latex paints and glazes; and for drilling muds. The polymer product is also useful as a dispersing agent in paper making.

The polymer product is particularly useful as an additive in cleaning compositions such as in cleaning and detergent formulations. Cleaning and detergent formulations containing the polymer product may be in any of the usual physical forms, such as for example powders, beads, flakes, bars, tablets, noodles, liquids, pastes, and slurries. The cleaning and detergent formulations are prepared and utilized in the conventional manner and are usually based on surfactants, and optionally, on either precipitant or sequestrant builders.

Suitable surfactants are, for example, anionic surfactants, such as from $C_8$ to $C_{12}$ alkylbenzenesulfonates, from $C_{12}$ to $C_{16}$ alkanesulfonates, from $C_{12}$ to $C_{16}$ alkylsulfates, from $C_{12}$ to $C_{16}$ alkylsulfosuccinates and from $C_{12}$ to $C_{16}$ sulfated ethoxylated alkanols and nonionic surfactants such as from $C_6$ to $C_{12}$ alkylphenol ethoxylates, from $C_{12}$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide. The surfactants usable in detergents can also have an amphoteric character and they can be soaps.

In general, the surfactants constitute from 2 to 50, preferably 5 to 45 percent by weight of the cleaning or detergent formulation. Liquid detergent or cleaning formulations usually contain as components liquid or even solid surfactants which are soluble or at least dispersible in the formulation. Surfactants suitable for this purpose are liquid polyalkylene oxides or polyalkoxylated compounds, products that can also be used in powdered detergents.

Examples of sequestrant builders contained in the cleaning and detergent formulations can include phosphates, specifically, pyrophosphates, polyphosphates, and especially sodium tripolyphosphate. Further examples are the zeolites, sodium carbonate, poly(carboxylic acids), nitrilotriacetic acid, citric acid, tartaric acid, the salts of the aforesaid acids and the monomeric, oligomeric or polymeric phosphonates.

The amounts of the individual substances used in the preparation of cleaning and detergent formulations by weight based on the total weight of the formulation are, for example, up to 85 weight percent sodium carbonate, up to 45 weight percent phosphates, up to 40 weight percent zeolites, up to 30 weight percent nitrilotriacetic acid and phosphonates and up to 30 weight percent polycarboxylic acids. In certain liquid detergent markets the use of builders is usually limited to citric acid and its salts or a combination of citrate and fatty acid soap, while in other markets liquid detergent compositions incorporate an intermediate level of soap, about 15 weight percent, or tripolyphosphate, about 20 weight percent, to assist overall cleaning efficacy.

Other common additives to cleaning compositions and especially detergent formulations are bleaching agents, used in an amount of up to 30 weight percent; corrosion inhibitors, such as silicates, used in an amount of up to 25 weight percent; dye transfer inhibiting agents, used in an amount up to 20 weight percent; and graying inhibitors used in an amount of up to 5 weight percent. Suitable bleaching agents are, for example, perborates, percarbonates or chlorine-generating substances, such as chloroisocyanurates. Suitable silicates used as corrosion inhibitors are, for example, sodium silicate, sodium disilicate and sodium metasilicate. Suitable dye transfer inhibiting agents are for example poly(vinyl pyrrolidone). Examples of graying inhibitors are carboxymethylcellulose, methylcellulose, hydroxypropylmethylcellulose and graft copolymers of vinyl acetate and polyalkylene oxides having a molecular weight of 1,000 to 15,000. Other common optional additives used in cleaning compositions and especially detergent formulations are optical brighteners, enzymes and perfumes.

Powdered detergent formulations can also contain up to 50 weight percent of an inert diluent, such as sodium sulfate, sodium chloride, or sodium borate. The detergent formulations can be anhydrous or they can contain small amounts, for example up to 10 weight percent, of water. Liquid detergents can contain up to 80 weight percent water as an inert diluent.

One or more of the polymer products produced from the process of the present invention can be added to cleaning compositions including cleaning and detergent formulations at levels where they provide the intended benefit. Generally, this level will be from about 0.5 to about 50 weight percent, preferably from about 1 to about 40 weight percent of polymer product, based on the total weight of the formulation. For example, if the polymer product is used as a builder in a detergent or cleaning formulation, the level in the formulation will be from about 5 to about 40 weight percent, based on the total weight of the formulation. In some cases, particularly when used as a soil removal agent and soil redeposition inhibitor, the amount of polymer product actually used is preferably between about 1 and 10 weight percent, based on the cleaning and detergent formulation. Of particular importance is the use of the additives according to the invention in low phosphate detergents and cleaning agents, particularly those containing a precipitant builder such as sodium carbonate. The polymer product of the present invention is particularly useful for the prevention of encrustation in detergent and cleaning formulations containing greater than 50 weight percent sodium carbonate. Low-phosphate formulations contain up to a maximum of 10 weight percent of sodium tripolyphosphate or pyrophosphate.

If desired, the polymer product prepared according to the process of the present invention can be used in detergent formulations together with other acrylic acid homopolymers. The acrylic acid homopolymers are currently being used as soil redeposition inhibitors in detergent formulations. The polymer product can be added to detergent and cleaning formulations in unneutralized, partially neutralized or completely neutralized form.

Other preferred applications for the polymer product produced by the process of this invention include its use in water circulating systems. In water circulating systems, the polymer product may act as a dispersant, and may also act as an anti-nucleating agent where minor amounts of the polymer product can serve as a threshold inhibitor for crystal formation or scaling. Water circulating systems in which the polymer product is useful include those systems used for cooling water towers, boilers, water desalination plants, sugar recovery plants, oil drilling wells, reverse osmosis equipment, steam power plants, and heat exchange equipment. When used to inhibit crystal formation or scaling, the polymers are often combined with corrosion inhibitors such as inorganic or organic phosphates or phosphonates or metallic salts such as zinc compounds and the like.

The polymer product can be added directly to the aqueous system in an amount of 0.1 to 500 ppm by weight. The polymer product may also be added to the system as a concentrated aqueous composition containing one or more inert diluents wherein the polymer product is present in the composition at a level of from 20 percent to 60 percent by weight.

EXAMPLES

The following examples are presented to illustrate the preparation of the polymer product prepared according to the process of the present invention and are presented by way of illustration and are not to be construed as limiting the scope of this invention as defined in the claims.

The weight average molecular weights (Mw) and the number average molecular weights (Mn) in Examples 1–16 were measured by aqueous gel permeation chromatography (GPC) relative to a 4,500 Mw poly(acrylic acid) standard.

The color of the polymer product was measured using the Platinum-Cobalt Color Test Method, ASTM Test Method D 1209. The Platinum-Cobalt Color Test Method assigns Platinum-Cobalt Standards, prepared according to the test method, to Color Standard Numbers ranging from 1 to 500. The polymer solution to be analyzed for color is visually compared to the Platinum Cobalt Standards and given a Color Standard Number corresponding to the standard which the polymer solution is closest in color to. A Color Standard Number of 1 denotes the solution is almost water white, while a value of 500 denotes the solution is dark brown.

BATCH PROCESS EXAMPLES
95 Weight Percent Acrylic Acid/5 Weight Percent Maleic Anhydride

Example 1

To a 1 liter four necked round bottom flask equipped with a mechanical stirrer, a reflux condenser, and a thermocouple, were added 177.2 grams of deionized water, 14.0 grams of maleic anhydride, and 6.6 grams of a metal promoter solution of 0.15 weight percent ferrous sulfate in deionized water to form a reaction mixture. The reaction mixture was heated to 72° C. after which the following three separate feeds were started at the same time: 1) 266.0 grams of glacial acrylic acid, 2) a sodium metabisulfite feed solution of 26.6 grams of sodium metabisulfite and 90 grams of deionized water, 3) an initiator solution of 6.6 grams sodium persulfate and 42.0 grams of deionized water. The sodium metabisulfite feed solution was fed for 75 minutes and the glacial acrylic acid and initiator solution were fed for 90 minutes. After the three feeds were completed, the reaction mixture was held at 72° C. for 15 minutes, and then cooled to 40° C. After the reaction mixture was cooled, 24.5 grams of a 50 weight percent aqueous solution of sodium hydroxide and 1.7 grams of a 30 weight percent aqueous solution of hydrogen peroxide were added while maintaining the temperature between 35° C. and 40° C.

A polymer product solution resulted having an aqueous solution pH of 3.0 and a weight percent solids of 50.7. The polymer product solution results are reported in Table 1.
90Weight Percent Acrylic Acid/10 Weight Percent Maleic Anhydride

Example 2
18.6 Weight Percent Chain Transfer Agent

To the equipment described in Example 1, were added 125.0 grams of deionized water, 13.3 grams of maleic anhydride, a sodium metabisulfite solution of 0.68 grams of sodium metabisulfite and 2.0 grams of deionized water, and 3.3 grams of a metal promoter solution of 0.15 weight percent ferrous sulfate in deionized water to form a reaction mixture. The reaction mixture was heated to 72° C. after which the following three separate feeds were started at the same time: 1) 133.0 grams of glacial acrylic acid, 2) a sodium metabisulfite feed solution of 26.6 grams of sodium metabisulfite and 50 grams of deionized water, 3) an initiator solution of 5.0 grams sodium persulfate and 21.0 grams of deionized water. The sodium metabisulfite feed solution was fed for 75 minutes and the glacial acrylic acid and initiator solution were fed for 90 minutes. After the three feeds were completed, the reaction mixture was held at 72° C. for 15 minutes. Following the hold, a solution of 0.05 grams of sodium persulfate in 1 gram of deionized water was fed over a 15 minute period as a monomer chase. This monomer chase was repeated a second time after which the reaction mixture was cooled to 40° C. After the reaction mixture was cooled, 166.0 grams of a 50 weight percent aqueous solution of sodium hydroxide was added while maintaining the temperature between 35° C. and 40° C.

A polymer product solution resulted having an aqueous solution pH of 7.0 and a weight percent solids of 42.9. The polymer product solution results are reported in Table 1.

Example 3
8.1 Weight Percent Chain Transfer Agent

To a 20 liter reactor equipped with a mechanical stirrer, a reflux condenser, a thermocouple, and 4 inlet ports, were added 6644.4 grams of deionized water, 804.4 grams of maleic anhydride, a sodium metabisulfite solution of 23.7 grams of sodium metabisulfite and 121.0 grams of deionized water, and 199.6 grams of a metal promoter solution of 0.15 weight percent ferrous sulfate in deionized water to form a reaction mixture. The reaction mixture was heated to 72° C. after which the following three separate feeds were started at the same time: 1) 8043.9 grams of glacial acrylic acid, 2) a sodium metabisulfite feed solution of 695.9 grams of sodium metabisulfite and 1282.4 grams of deionized water, 3) an initiator solution of 143.5 grams sodium persulfate and 1270.1 grams of deionized water. The sodium metabisulfite feed solution was fed for 60 minutes and the glacial acrylic add and initiator solution were fed for 90 minutes. After the three feeds were completed, the reaction mixture was held at 72° C. for 15 minutes, and then cooled to 40° C. After the reaction mixture was cooled, 892.1 grams of a 50 weight percent aqueous solution of sodium hydroxide and 300.0 grams of a 30 weight percent aqueous solution of hydrogen peroxide were added while maintaining the temperature between 35° C. and 40° C.

A polymer product solution resulted having an aqueous solution pH of 3.2 and a weight percent solids content of 50.82. The polymer product solution results are reported in Table 1.

Comparative Example 4
No Chain Transfer Agent

To the equipment described in Example 1, were added 240.0 grams of deionized water and 16.0 grams of a solution of 0.15 weight percent copper sulfate in deionized water to form a reaction mixture. The reaction mixture was heated to 100° C. after which the following three separate feeds were started at the same time: 1) a monomer solution of 21.1 grams of maleic anhydride and 224.9 grams of glacial acrylic acid, 2) a neutralizer solution of 145.5 grams of a 50 weight percent aqueous solution of sodium hydroxide, and 3) 83.30 grams of an initiator solution of a 30 weight percent aqueous solution of hydrogen peroxide. The three solutions were fed linearly over 90 minutes. After the three feeds were completed, the reaction mixture was held at 102° C. for 30 minutes, and then cooled to room temperature.

A polymer product solution was produced having an aqueous solution pH of 5.4 and a weight percent solids content of 39.04. The polymer product solution results are reported in Table 1.

85 Weight Percent Acrylic Acid/15 Weight Percent Maleic Anhydride

Example 5

To the equipment described in Example 1, were added 125.0 grams of deionized water, 20.0 grams of maleic anhydride, a sodium metabisulfite solution of 0.68 grams of sodium metabisulfite and 2.0 grams of deionized water, and 3.3 grams of a metal promoter solution of 0.15 weight percent ferrous sulfate in deionized water to form a reaction mixture. The reaction mixture was heated to 72° C. after which the following three separate feeds were started at the same time: 1) 133.0 grams of glacial acrylic acid, 2) a sodium metabisulfite feed solution of 40.0 grams of sodium metabisulfite and 75.8 grams of deionized water, 3) an initiator solution of 3.3 grams sodium persulfate and 21.0 grams of deionized water. The sodium metabisulfite feed solution was fed for 75 minutes and the glacial acrylic acid and initiator solution were fed for 90 minutes. After the three feeds were completed, the reaction mixture was held at 72° C. for 15 minutes. Following the hold, a solution of 0.05 grams of sodium persulfate in 1 gram of deionized water was fed over a 15 minute period as a monomer chase after which the reaction mixture was cooled to 40° C. After the reaction mixture was cooled, 174.0 grams of a 50 weight percent aqueous solution of sodium hydroxide was added while maintaining the temperature between 35° C. and 40° C.

A polymer product solution resulted having an aqueous solution pH of 7.0 and a weight percent solids of 43.8. The polymer product solution results are reported in Table 1.

80 Weight Percent Acrylic Acid/20 weight percent Maleic Anhydride

Example 6
Cofeed of Dicarboxylic Acid Monomer/14.4 Weight Percent Chain Transfer Agent To the equipment described in Example 3, were added a sodium metabisulfite solution of 2.5 grams of sodium metabisulfite and 12.7 grams of deionized water, and a metal promoter solution of 20.9 grams of a 0.15 weight percent solution of ferrous sulfate in deionized water to form a reaction mixture. The reaction mixture was heated to 72° C. after which the following four separate feeds were started at the same time: 1) 421.0 grams of glacial acrylic acid, 2) a maleic add solution of 84.2 grams of maleic anhydride and 126.3 grams of deionized water, 3) a sodium metabisulfite feed solution of 72.8 grams of sodium metabisulfite and 134.2 grams of deionized water, 4) an initiator solution of 15.0 grams of sodium persulfate and 132.9 grams of deionized water. The sodium metabisulfite feed solution was fed for 45 minutes, the glacial acrylic acid and initiator solution were fed for 60 minutes, and the maleic acid solution was fed for 30 minutes. After the three feeds were completed, the reaction mixture was held at 72° C. for 15 minutes, and then cooled to 40° C. After the reaction mixture was cooled, 93.4 grams of a 50 weight percent aqueous solution of sodium hydroxide and 31.4 grams of a 30 weight percent aqueous solution of hydrogen peroxide were added while maintaining the temperature between 35° C. and 40° C.

A polymer product solution was produced having an aqueous solution pH of 3.0 and a weight percent solids content of 50.5. The polymer product solution results are reported in Table 1.

Comparative Example 7
No Chain Transfer Agent

To the equipment described in Example 1, were added 240.0 grams of deionized water and 16.0 grams of a solution of 0.15 weight percent copper sulfate in deionized water to form a reaction mixture. The reaction mixture was heated to 100° C. after which the following three separate feeds were started at the same time: 1) a monomer solution of 42.20 grams of maleic anhydride and 200.0 grams of glacial acrylic acid, 2) a neutralizer solution of 145.5 grams of a 50 weight percent aqueous solution of sodium hydroxide, and 3) 83.30 grams of an initiator solution of a 30 weight percent aqueous solution of hydrogen peroxide. The three solutions were fed linearly over 90 minutes. After the three feeds were completed, the reaction mixture was held at 102° C. for 30 minutes, and then cooled to room temperature.

A polymer product solution was produced having an aqueous solution pH of 5.1 and a weight percent solids content of 40.9. The polymer product solution results are reported in Table 1.

50 Weight Percent Acrylic Acid/50 weight percent Maleic Anhydride

Example 8

To the equipment described in Example 1, were added 140.0 grams of deionized water, 83.1 grams of maleic anhydride, a sodium metabisulfite solution of 0.25 grams of sodium metabisulfite and 1 gram of deionized water, and 3.3 grams of a metal promoter solution of 0.15 weight percent ferrous sulfate in deionized water to form a reaction mixture. The reaction mixture was heated to 72° C. after which the following three separate feeds were started at the same time: 1) 83.1 grams of glacial acrylic acid, 2) a sodium metabisulfite feed solution of 49.9 grams of sodium metabisulfite and 97.0 grams of deionized water, 3) an initiator solution of 3.3 grams sodium persulfate and 21.0 grams of deionized water. The sodium metabisulfite feed solution was fed for 60 minutes and the glacial acrylic acid and initiator solution were fed for 90 minutes. After the three feeds were completed, the reaction mixture was held at 72° C. for 15 minutes. Following the hold, a solution of 0.5 grams of sodium persulfate in 10 grams of deionized water was fed over a 30 minute period as a monomer chase and the reaction mixture was then cooled to 40° C. After the reaction mixture was cooled, 186.0 grams of a 50 weight percent aqueous solution of sodium hydroxide was added while maintaining the temperature between 35° C. and 40° C.

A polymer product solution was produced having an aqueous solution pH of 7.0 and a weight percent solids of 42.7 The polymer product solution results are reported in Table 1.

TABLE 1

POLYMERIZATION RESULTS OF EXAMPLES 1–8

| Example | Composition | Mw | PD[1] | Wt % Res. MAL[2] | Wt % Res. AA[3] | Color[4] | Wt % Initiator[5] | Wt % CTA[6] | PPM of Metal[7] |
|---|---|---|---|---|---|---|---|---|---|
| 1 | 95 AA/5 MAL | 3640 | 1.38 | <0.01 | 0.13 | 300 | 2.3 | 9.5 | 13.0 |
| 2 | 90 AA/10 MAL | 2320 | 1.21 | <0.01 | <0.01 | <5 | 3.4 | 18.6 | 12.5 |
| 3 | 90 AA/10 MAL | 5740 | 1.64 | 0.03 | <0.01 | 30 | 1.6 | 8.1 | 12.5 |
| Comp. 4 | 90 AA/10 MAL | 5310 | 1.45 | 0.06 | 0.02 | 450 | 10.1 | 0.0 | 38.8 |
| 5 | 85 AA/15 MAL | 2350 | 1.38 | <0.01 | <0.01 | <5 | 2.2 | 26.6 | 11.9 |
| 6 | 80 AA/ 20 MAL | 4580 | 1.27 | 0.26 | 0.09 | 20 | 3.0 | 14.9 | 22.9 |
| Comp. 7 | 80 AA/ 20 MAL | 5080 | 1.43 | 0.40 | 0.10 | 450 | 10.3 | 0.0 | 39.4 |
| 8 | 50 AA/50 MAL | 3150 | 1.22 | 2.45 | 0.15 | 150 | 2.0 | 30.2 | 11.0 |

Key to TABLE 1:
AA Percent by weight acrylic acid
MAL Percent by weight maleic anhydride
Comp. Comparative
[1]Polydispersity (Mw/Mn)
[2]Weight percent residual maleic acid in the final polymer product.
[3]Weight percent residual acrylic acid in the final polymer product.
[4]Color Standard Number, ASTM Method D 1209.
[5]Weight percent initiator added based on weight of monomer added.
[6]Weight percent chain transfer agent added based on weight of monomer added.
[7]PPM of metal promoter as metal ion based on weight of monomer added.

Discussion of Examples 1–8

Table 1

Table 1 shows that the process of the present invention is effective in controlling the Mw of the polymer product to below 30,000. Examples 2 and 3 indicate that as the level of initiator and chain transfer increase, the molecular weight of the polymer product decreases. An advantage to the process of the present invention is that the polymer product produced by the process of the present invention is lower in color in comparison to Comparative Examples 4 and 7. Comparative Examples 4 and 7 were made with no chain transfer agent, and used higher levels of metal promoter and initiator. The process of the present invention also produces a polymer product which contains low levels of residual monomer.

EFFECT OF REACTION MIXTURE pH

90 Weight Percent Acrylic Acid/10 Weight Percent Maleic Anhydride

Example 9

No neutralization

To the equipment described in Example 1, were added 170.7 grams of deionized water, 21.1 grams of maleic anhydride, a sodium metabisulfite solution of 0.6 grams of sodium metabisulfite and 3.2 gram of deionized water, and 5.2 grams of a metal promoter solution of 0.15 weight percent ferrous sulfate in deionized water to form a reaction mixture. The reaction mixture was heated to 72° C. after which the following three separate feeds were started at the same time: 1) 210.5 grams of glacial acrylic add, 2) a sodium metabisulfite feed solution of 18.2 grams of sodium metabisulfite and 33.6 grams of deionized water, 3) an initiator solution of 3.8 grams sodium persulfate and 33.2 grams of deionized water. The sodium metabisulfite feed solution was fed for 75 minutes and the glacial acrylic acid and initiator solution were fed for 90 minutes. After the three feeds were completed, the reaction mixture was held at 72° C. for 15 minutes. Following the hold, the reaction mixture was cooled to room temperature.

A polymer product solution was produced having an aqueous solution pH of 2.2 (25° C.). The polymer product solution results are reported in Table 2.

Comparative Example 10 pH 4

To a one liter four necked round bottom flask equipped with a mechanical stirrer, a reflux condenser, a thermocouple, and pH probe were added 170.7 grams of deionized water, 21.1 grams of maleic anhydride, a sodium metabisulfite solution of 0.6 grams of sodium metabisulfite and 3.2 grams of deionized water, and 5.2 grams of a metal promoter solution of 0.15 weight percent ferrous sulfate in deionized water to form a reaction mixture. The reaction mixture was heated to 72° C. after which the following four separate feeds were started at the same time: 1) 210.5 grams of glacial acrylic acid, 2) a sodium metabisulfite feed solution of 18.2 grams of sodium metabisulfite and 33.6 grams of deionized water, 3) an initiator solution of 3.8 grams sodium persulfate and 33.2 grams of deionized water and 4) a 50 weight percent aqueous solution of sodium hydroxide which was added at a rate to maintain the reaction mixture at a pH of 4. The sodium metabisulfite feed solution was fed for 75 minutes and the glacial acrylic acid and initiator solution were fed for 90 minutes. The reaction mixture became very viscous during the feeding. After the three feeds were completed, the reaction mixture was held at 72° C. for 15 minutes and then cooled to room temperature. The reaction mixture solidified upon cooling. The results of the resulting polymer product are reported in Table 2.

70 Weight Percent Acrylic Acid/30 Weight Percent Maleic Anhydride

Example 11

No Neutralization

To the equipment described in Example 1, were added 140.0 grams of deionized water, 49.9 grams of maleic anhydride, a sodium metabisulfite solution of 0.25 grams of sodium metabisulfite and 1.0 gram of deionized water, and 3.3 grams of a metal promoter solution of 0.15 weight percent ferrous sulfate in deionized water to form a reaction mixture. The reaction mixture was heated to 72° C. after which the following three separate feeds were started at the same time: 1) 116.4 grams of glacial acrylic acid, 2) a sodium metabisulfite feed solution of 37.4 grams of sodium metabisulfite and 72.6 grams of deionized water, 3) an initiator solution of 3.3 grams sodium persulfate and 21.0 grams of deionized water. The sodium metabisulfite feed solution was fed for 75 minutes and the glacial acrylic acid and initiator solution were fed for 90 minutes. After the three feeds were completed, the reaction mixture was held at 72° C. for 15 minutes. Following the hold, a solution of 0.05 grams of sodium persulfate in 10 grams of deionized water was fed over a 15 minute period as a monomer chase, after which the reaction mixture was cooled to 40° C. After the reaction mixture was cooled, 189.0 grams of a 50 weight percent aqueous solution of sodium hydroxide was added while maintaining the temperature between 35° C. and 40° C.

A polymer product solution resulted having an aqueous solution pH of 7.0 and a weight percent solids of 43.5. The polymer product solution results are reported in Table 2.

Comparative Example 12
pH 4

To a two liter four necked round bottom flask equipped with a mechanical stirrer, a reflux condenser, a thermocouple, and pH probe were added 350.0 grams of deionized water, 124.7 grams of maleic anhydride, a sodium metabisulfite solution of 0.6 grams of sodium metabisulfite and 2.5 grams of deionized water, and 8.2 grams of a metal promoter solution of 0.15 weight percent ferrous sulfate in deionized water to form a reaction mixture. The reaction mixture was heated to 72 ° C. after which the following four separate feeds were started at the same time: 1) 291.0 grams of glacial acrylic acid, 2) a sodium metabisulfite feed solution of 93.5 grams of sodium metabisulfite and 181.5 grams of deionized water, 3) an initiator solution of 8.25 grams sodium persulfate and 52.5 grams of deionized water and 4) a 50 weight percent aqueous solution of sodium hydroxide which was added at a rate to maintain the reaction mixture at a pH of 4. The sodium metabisulfite feed solution was fed for 120 minutes and the glacial acrylic acid and initiator solution were fed for 150 minutes. After the three feeds were completed, the reaction mixture was held at 72° C. for 15 minutes. Following the hold, a solution of 0.3 grams of sodium persulfate in 2.5 grams of deionized water was fed over a 15 minute period as a monomer chase. This monomer chase was repeated for a second time, after which the reaction mixture was cooled to 40° C. After the reaction mixture was cooled, the pH of the reaction mixture was adjusted to pH of 7 with a 50 weight percent aqueous solution of sodium hydroxide while maintaining the temperature between 35° C. and 40° C.

A polymer product solution was produced having a weight percent solids of 44.4. The polymer product solution results are reported in Table 2.

TABLE 2

EFFECT OF pH ON MOLECULAR WEIGHT

| Example | Composition | Mw | PD[1] | Wt % Res. MAL[2] | Wt % Res. AA[3] | Color[4] | pH[5] | Wt % Initiator[6] | Wt % CTA[7] | PPM of Metal[8] |
|---|---|---|---|---|---|---|---|---|---|---|
| 9 | 90 AA/10 MAL | 5590 | 1.5 | 0.04 | 0.04 | <5 | 1.4 | 1.6 | 8.1 | 12.4 |
| Comp. 10 | 90 AA/10 MAL | 79300 | 3.56 | 0.07 | 0.05 | 400 | 4.0 | 1.6 | 8.1 | 12.4 |
| 11 | 70 AA/30 MAL | 3520 | 1.21 | 0.01 | 0.01 | <5 | 1.0 | 2.0 | 22.6 | 11.0 |
| Comp. 12 | 70 AA/30 MAL | 54600 | 2.49 | 0.1 | 0.25 | >500 | 4.0 | 2.0 | 22.6 | 10.9 |

Key to TABLE 2:
AA Percent by weight acrylic acid
MAL Percent by weight maleic anhydride
[1]Polydispersity (Mw/Mn).
[2]Weight percent residual maleic acid in the final polymer product.
[3]Weight percent residual acrylic acid in the final polymer product.
[4]Color Standard Number, ASTM Test Method D 1209.
[5]Average pH of reaction mixture over reaction time.
[6]Weight percent initiator added based on weight of monomer added.
[7]Weight percent chain transfer agent added based on weight of monomer added.
[8]PPM of metal promoter as metal ion based on weight of monomer.

Discussion of Examples 9–12
Table 2

The results in Table 2 show that when the pH of the reaction mixture was maintained at a pH of 4 over the reaction time, a polymer product of over 30,000 Mw was produced (Comparative Examples 10 and 12). In contrast, Examples 9 and 11 were run using the same process as in Comparative Examples 10 and 12, respectively, except that the reaction mixture pH was below 2 over the reaction time. However, Examples 9 and 11 produced a polymer product having a Mw of less than 6,000.

CONTINUOUS PROCESS EXAMPLES
90 Weight Percent Acrylic Acid/10 weight percent Maleic Anhydride Example 13
Intermittent Feed of Maleic Anhydride A continuous process was run in two steps: 1) a start-up step, and 2) a continuous step:
Start Up Step:

To a 2 liter reactor equipped with a mechanical stirrer, a reflux condenser, a thermocouple, and 4 inlet ports, were added 556.1 grams of deionized water, a sodium metabisulfite solution of 2.5 grams of sodium metabisulfite and 12.7 grams of deionized water, and a metal promoter solution of 20.9 grams of a 0.15 weight percent solution of ferrous sulfate in deionized water to form a reaction mixture. The reaction mixture was heated to 72° C. after which the following four separate feeds were started at the same time: 1) 841.9 grams of glacial acrylic acid, 2) a maleic acid solution of 84.2 grams of maleic anhydride and 126.3 grams of deionized water, 3) a sodium metabisulfite feed solution of 72.8 grams of sodium metabisulfite and 134.2 grams of deionized water, 4) an initiator solution of 15.0 grams of sodium persulfate and 132.9 grams of deionized water. The four feeds were fed at a linear rate for 60 minutes to form a polymer product solution in the reactor.
Continuous Step:

At the end of the 60 minutes, the glacial acrylic acid, sodium metabisulfite solution, and initiator solution were fed into the reactor at the same linear rate as in the start-up step. In addition to these three feeds the following feeds were started: 1) a second maleic acid solution of 84.2 grams of maleic anhydride and 404.5 grams of deionized water fed linearly over the first 30 minutes of each 60 minutes, 2) a continuous metal promoter feed solution of 20.9 grams of 0.15 weight percent ferrous sulfate in deionized water fed linearly over 60 minutes, and 3) 278.3 grams of deionized water fed linearly over the second 30 minutes of each 60 minutes. At the same time the feeds were fed to the reactor, the polymer product solution was continuously removed from the reactor at a rate equal to the total rate of all feeds being fed into the reactor. The polymer product solution was collected in a separate container for each 60 minutes of feeding. Analysis of each container of polymer product solution collected is shown below in Table 1:

TABLE 3

POLYMER PRODUCT ANALYSIS FOR EXAMPLE 13

| Time after continuous step started (minutes) | Container Collected (8.1 wt % CTA) | | | | | |
|---|---|---|---|---|---|---|
| | 60 | 120 | 180 | 240 | 300 | Reactor |
| Mw | 5280 | 5030 | 4860 | 4890 | 4720 | 4700 |
| Mn | 4120 | 4070 | 3910 | 3990 | 3870 | 3880 |
| Mw/Mn | 1.28 | 1.23 | 1.24 | 1.23 | 1.22 | 1.21 |
| Wt % Residual AA | 0.34 | 0.45 | 0.46 | 0.45 | 0.44 | 0.22 |
| Wt % Residual MAL | 0.84 | 0.96 | 1.10 | 1.09 | 1.10 | 0.21 |
| pH | 0.95 | 0.92 | 0.85 | 1.71 | 1.65 | n.m. |
| Wt % Solids | 51.66 | 51.85 | 51.81 | 51.66 | 51.79 | 52.67 |

The results of Table 3 demonstrate that the process of the present invention may be run as a continuous process and still maintain good molecular weight control. The "Reactor" column is the analysis of polymer product which was left in the reactor at the end of 300 minutes.

Example 14

Effect of Reducing the Level of Chain Transfer Agent

The polymer product left in the reactor from Example 13 was used as the starting reaction material for this Example. A continuous step was run according to the continuous step procedure in Example 13, except that the sodium metabisulfite solution which was linearly fed over each 60 minute period consisted of 60.1 grams of sodium metabisulfite and 134.2 grams of deionized water. The continuous step was run for 180 minutes and polymer product was collected in a different container during each 60 minute period of feeding. At the end of the 180 minutes, the sodium metabisulfite solution fed was diluted such that 35.5 grams of sodium metabisulfite and 134.2 grams of deionized water were fed linearly over each 60 minute period. The continuous process was run for an additional 120 minutes. Analysis of each container of polymer product solution collected is shown below in Table 4:

TABLE 4

POLYMER PRODUCT ANALYSIS FOR EXAMPLE 14

| | Container Collected | | | | | |
|---|---|---|---|---|---|---|
| | 6.5 wt % CTA | | | 3.8 wt % CTA | | |
| Time after continuous step started (minutes) | 60 | 120 | 180 | 240 | 300 | Reactor |
| Mw | 5310 | 5860 | 6140 | 6910 | 8970 | 9620 |
| Mn | 4240 | 4660 | 4840 | 5130 | 6240 | 6540 |
| Mw/Mn | 1.25 | 1.26 | 1.27 | 1.35 | 1.44 | 1.47 |
| Wt % Residual AA | 0.46 | 0.50 | 0.55 | 0.51 | 0.63 | 0.50 |
| Wt % Residual MAL | 1.31 | 1.39 | 1.44 | 1.46 | 1.74 | 1.33 |
| pH | 1.53 | 1.46 | 1.36 | 1.11 | 1.17 | n.m. |

Key to TABLE 3 and 4:
AA Percent by weight acrylic acid
MAL Percent by weight maleic anhydride
CTA Chain Transfer agent
n.m. no measurement The results in Table 4 show that as the level of chain transfer agent is decreased, the Mw of the polymer product is increased. By adjusting the level of chain transfer agent, the Mw in the process of the present invention can be controlled to obtain a polymer product of the desired molecular weight.

Performance in Cleaning Applications

ENCRUSTATION INHIBITION

The polymer products were tested for calcium carbonate encrustation inhibiting properties by washing black fabric swatches with a detergent formulation containing the polymer to be tested. The washed black fabric swatches were visually ranked for the amount of calcium carbonate deposition using a scale from 0 to 10. The scale value of 0 was assigned to an unwashed black fabric swatch and a scale value of 10 was assigned to a fabric swatch washed with the detergent formulation containing no test polymer.

The following test procedure was used for washing the black fabric swatches: Prewashed black cotton t-shirt fabric was cut into five gram test fabric swatches. For each polymer tested, one test fabric swatch was laundered in a 1 liter Terg-o-tometer (Model Number 7243S, manufactured by United States Testing Company, Inc. Hoboken, N.J.) with a detergent formulation containing the polymer to be tested. One test fabric swatch, as a control, was washed with the detergent formulation containing no polymer. Each wash cycle consisted of a 12 minute wash and 3 minute rinse. Each test fabric swatch was laundered for 5 wash cycles with wash water at a temperature of 35° C. and a hardness as calcium carbonate of 350 ppm. The detergent formulation used is similar to that shown in Table 5. The level of detergent used in the wash water was 0.18 weight percent based on the weight of the wash water (1000 grams). The test fabrics were air dried overnight.

The dried test fabric swatches were ranked visually at the same time on a scale of 0 to 10 for the amount of calcium carbonate deposition. The results are shown in Table 6. The no polymer control, ranked at a value of 10, visually appears completely gray, where as the unwashed fabric appears black.

TABLE 5

Detergent Formulation
(in parts by weight)

| | |
|---|---|
| 81.9 | Na carbonate |
| 5.0 | Na bicarbonate |
| 3.8 | Hydrous Na silicate |
| 4.2 | Sulfuric acid ester of ethoxylated alcohol |
| 2.5 | Ethoxylated long chain alcohol |
| 1.1 | Minor Additives such as optical brightener and perfume |
| 1.5 | Polymer Product as polymer solids |

TABLE 6

EFFECTIVENESS OF POLYMER PRODUCT IN INHIBITING ENCRUSTATION

| EXAMPLE | Composition | Mw | Rank |
|---|---|---|---|
| No Polymer Washed Fabric | — | — | 10 |
| Unwashed Fabric | — | — | 0 |
| Example 1 (from Table 1) | 95 AA/5 MAL | 3640 | 3 |
| Example 15 | 90 AA/10 MAL | 5590 | 2 |
| Comp. Example 4 (from Table 1) | 90 AA/10 MAL | 5310 | 7 |
| Example 6 (from Table 1) | 80 AA/20 MAL | 4580 | 3 |
| Comp. Example 7 (from Table 1) | 80 AA/20 MAL | 5080 | 4 |

Key to TABLE 6:
AA Percent by weight acrylic acid
MAL Percent by weight maleic acid Table 6 shows that the polymer products produced by the process of the present invention are useful in detergent formulations for inhibiting encrustation in laundry applications. Example 15 is a polymer product made according to the procedure in Example 3 except that 13.9 weight percent chain transfer agent was added to the reaction mixture instead of 8.1 weight percent. Example 15, which was made using sodium metabisulfite as a chain transfer agent, is more effective in inhibiting encrustation than Comparative Example 4, which uses no chain transfer agent. Additionally, Example 6 shows improvement over Comparative Example 7. Example 6 was also made using sodium metabisulfite as a chain transfer agent and Comparative Example 7 used no chain transfer agent.

Performance in Water Treatment Applications

Inhibition of the Precipitation of Calcium Carbonate

The following test method was used to measure the ability of the polymer products made by the process of the present invention to inhibit the precipitation of calcium carbonate in water treatment applications. The following solutions were prepared:

| A. | Stock Solution 1: | 2.78 grams $CaCl_2 \cdot 2\ H_2O$ |
| | | 2.04 grams KCl |
| | | 4.97 grams $MgCl_2 \cdot 6\ H_2O$ |
| | | 76.68 grams NaCl |
| | | Deionized Water (to make 2 liters of Stock Solution 1) |
| B. | Stock Solution 2: | 1.00 grams $Na_2CO_3$ |
| | | 2.04 grams KCl |
| | | 4.97 grams $MgCl_2 \cdot 6\ H_2O$ |
| | | 76.68 grams NaCl |
| | | Deionized Water (to make 2 liters of Stock Solution 2) |
| C. | Polymer Sample Solution: | 0.1 weight percent solid polymer to be tested |
| | | Deionized Water (Balance) |
| | | pH adjusted to 8 with NaOH |
| | | (adjusted after forming the Polymer Sample Solution) |

A Polymer Test Solution was prepared by adding to a four ounce jar, 50 ml of the Stock Solution 1, 2.0 ml of the Polymer Sample Solution, and 50 ml of the Stock Solution 2. Also, prepared in four ounce jars were a No Polymer Solution and a 100% Inhibited Solution of the following composition:

| No Polymer Solution (Control) | 50 ml Stock Solution 1 |
| | 50 ml Stock Solution 2 |
| 100% Inhibited Solution: (Control) | 50 ml Stock Solution 1 |
| | 50 ml Deionized Water |

The Polymer Test Solution was placed in a water bath at either 38° C. or 70° C. for 16 hours and then filtered while hot through a 0.45 micron filter. The Polymer Test Solution was then diluted with 25 ml of deionized water and cooled to room temperature.

To measure the inhibition of calcium carbonate precipitation, the filtered Polymer Test Solution, and the 100 Percent Inhibited Solution, were analyzed for divalent calcium ion using EDTA titration. The No Polymer Solution was also titrated with EDTA as a control. The percent calcium carbonate precipitation inhibited was calculated as follows:

Percent $CaCO_3$ Inhibition =

$$\frac{100 \times (\text{ml EDTA added to Polymer Test Solution})}{(\text{ml EDTA added to 100\% Inhibited Solution})}$$

The performance of the polymer product to inhibit the precipitation of calcium carbonate is shown in Table 7 below:

TABLE 7

Performance to Inhibit Precipitation of Calcium Carbonate

| | | | % $CaCO_3$ Inhibition | |
|---|---|---|---|---|
| Example | Composition | Mw | 38° C. | 70° C. |
| No Polymer Control | — | — | 50 | 41 |
| Example 16 | 95 AA/5 MAL | 4130 | 100 | 79 |

TABLE 7-continued

Performance to Inhibit Precipitation of Calcium Carbonate

| Example | Composition | Mw | % CaCO₃ Inhibition 38° C. | 70° C. |
|---|---|---|---|---|
| Example 15 | 90 AA/10 MAL | 5590 | 100 | 93 |

Key to TABLE 7:
AA Percent by weight acrylic acid
MAL Percent by weight maleic acid The results in Table 7 show that the polymer products made by the process of the present invention, are effective in inhibiting the precipitation of calcium carbonate when compared to the no polymer control in aqueous systems. Example 16 was prepared according to the procedure in Example 1 except that 7.5 instead of 9.5 weight percent chain transfer agent was added to the reaction mixture.

We claim:

1. A polymerization process comprising:
   (a) establishing an initial charge of water in a reactor;
   (b) adding into the reactor to form a reaction mixture
      (i) at least one water soluble chain transfer agent selected from alkali metal salts of sulfites,
      (ii) at least one water soluble initiator,
      (iii) at least one metal promoter,
      (iv) from about 50 to about 97 weight percent, based on the total weight of monomer added to the reactor, of at least one water soluble monoethylenically unsaturated monocarboxylic acid monomer,
      (v) from about 3 to about 50 weight percent, based on the total weight of monomer added to the reactor, of at least one monoethylenically unsaturated dicarboxylic acid monomer,
      (vi) from 0 to about 40 weight percent, based on the total weight of monomer added to the reactor, of one or more water soluble carboxyl-free monoethylenically unsaturated monomers, wherein the total weight percent of monomers (iv), (v), and (vi) equals 100 weight percent;
   (c) maintaining the reaction mixture at a temperature of from about 60° C. to about 120° C. over a reaction time;
   (d) maintaining the reaction mixture at a pH of less than 2 over the reaction time; and
   (e) recovering a water soluble polymer product having a weight average molecular weight less than 30,000;
   wherein the chain transfer agent, initiator, and monoethylenically unsaturated monocarboxylic acid monomer (iv) are added to the reactor over at least 25 percent of the reaction time.

2. The process of claim 1, wherein a water soluble polymer product is recovered having a Color Standard Number of 300 or less, as measured by the Platinum-Cobalt Test Method, ASTM Test Method D 1209.

3. The process of claim 1, wherein the monocarboxylic acid monomer is selected from the group consisting of: acrylic acid, methacrylic acid, and combinations thereof.

4. The process of claim 1, wherein the chain transfer agent is selected from the group consisting of alkali metal salts of metabisulfites and bisulfites.

5. The process of claim 1, wherein the amount of chain transfer agent added to the reactor is about less than 35 weight percent based on the total weight of monomer.

6. The process of claim 1, wherein the polymer product is formed from about 5 to about 35 weight percent of at least one dicarboxylic acid monomer.

7. The process of claim 1, wherein the polymer product is formed from about 5 to about 25 weight percent of at least one dicarboxylic acid monomer.

8. The process of claim 1, wherein the polymer product is formed from about 5 to about 15 weight percent of at least one dicarboxylic acid monomer.

9. The process of claim 1, wherein the reaction mixture is maintained at about a pH of 1.8 or less.

10. The process of claim 1, wherein the level of metal promoter added to the reactor is from about 1 to about 250 ppm metal ion based on the total weight of monomer.

11. The process of claim 1, wherein the level of metal promoter added to the reactor is from about 1 to about 25 ppm metal ion based on the total weight of monomer.

12. The process of claim 1, wherein the metal promoter is selected from the group consisting of: the water soluble salts of cobalt, iron, copper, cerium, nickel, manganese, molybdenum, zirconium, vanadium, zinc, and combinations thereof.

13. The process of claim 1, wherein the metal promoter is selected from the group consisting of: the water soluble salts of iron.

14. The process of claim 1, wherein the amount of water soluble initiator added to the reactor is from about 0.5 to about 25 weight percent based on the total weight of monomer.

15. The process of claim 1, wherein the water soluble initiator added to the reactor is a persulfate.

16. The process of claim 1, wherein the process is continuous.

17. The process of claim 1, wherein the initiator and monocarboxylic acid monomer are fed into the reactor over the same time.

18. The process of claim 1, wherein the chain transfer agent is fed into the reactor for a time less than the initiator and monocarboxylic acid monomer.

19. The process of claim 1, wherein the dicarboxylic acid monomer is fed into the reactor for a time less than the initiator, monocarboxylic acid monomer, and chain transfer agent.

20. The process of claim 1, wherein the dicarboxylic acid monomer is fed intermittently into the reactor.

21. The process of claim 1, wherein the dicarboxylic acid monomer is selected from the group consisting of: maleic acid, itaconic acid, mesaconic acid, fumaric acid, citraconic acid, alpha-methylene glutaric acid, maleic anhydride, cis-3,4,5,6-tetrahydrophthalic anhydride, and combinations thereof.

22. The process of claim 1, wherein the dicarboxylic acid monomer is selected from the group consisting of: maleic acid, maleic anhydride, and combinations thereof.

23. The process of claim 1, wherein the monocarboxylic acid monomer is selected from the group consisting of: acrylic acid, methacrylic acid, vinyl acetic acid, crotonic acid, and combinations thereof.

* * * * *